United States Patent
Chen et al.

(10) Patent No.: US 9,397,462 B2
(45) Date of Patent: Jul. 19, 2016

(54) RAIL MOUNTING SYSTEM AND DETACHING METHOD

(71) Applicant: General Electric Company, Schenectady, NY (US)

(72) Inventors: Gang Chen, Shanghai (CN); Yonggang Wang, Shanghai (CN); Zhiguo Huang, Shanghai (CN); Keith E. Gibson, Plano, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/836,313

(22) Filed: Mar. 15, 2013

(65) Prior Publication Data

US 2014/0187082 A1 Jul. 3, 2014

Related U.S. Application Data

(60) Provisional application No. 61/747,165, filed on Dec. 28, 2012.

(51) Int. Cl.
| | |
|---|---|
| *H01R 13/627* | (2006.01) |
| *H01R 43/18* | (2006.01) |
| *H02B 1/20* | (2006.01) |
| *H02B 1/052* | (2006.01) |
| *H01H 71/08* | (2006.01) |
| *H01H 71/04* | (2006.01) |

(52) U.S. Cl.
CPC .............. *H01R 43/18* (2013.01); *H02B 1/205* (2013.01); *H01H 71/082* (2013.01); *H01H 2071/042* (2013.01); *H02B 1/052* (2013.01); *Y10T 29/49117* (2015.01)

(58) Field of Classification Search
CPC ........ H01R 43/18; H02B 1/052; H02B 1/205; H01H 71/082; H01H 2071/042; Y10T 29/49117
USPC .................... 439/352, 357, 716, 94, 532, 537
See application file for complete search history.

(56) References Cited

U.S. PATENT DOCUMENTS

| | | | | |
|---|---|---|---|---|
| 4,351,990 | A | * 9/1982 | Hesselbart | H01H 33/022 200/50.22 |
| 6,086,415 | A | * 7/2000 | Sanchez et al. | 439/540.1 |
| 6,146,213 | A | * 11/2000 | Yoon | 439/716 |
| 7,365,964 | B2 | * 4/2008 | Donahue, IV | 361/622 |
| 7,374,453 | B1 | 5/2008 | Allcock et al. | |
| 7,520,776 | B2 | * 4/2009 | Wagener | 439/532 |
| 7,575,484 | B2 | * 8/2009 | Van Der Mee et al. | 439/716 |
| 8,011,951 | B2 | 9/2011 | Moore et al. | |
| 2002/0166229 | A1 | 11/2002 | Peltz et al. | |
| 2009/0127864 | A1 | * 5/2009 | Alvite | F03B 17/04 290/1 C |
| 2012/0044083 | A1 | * 2/2012 | Molnar et al. | 340/687 |

* cited by examiner

*Primary Examiner* — Jean F Duverne
(74) *Attorney, Agent, or Firm* — General Electric Company

(57) ABSTRACT

A rail mounting system for mounting a module on a structure is provided. The rail mounting system comprises a mounting rail comprises a base portion extending along an elongated direction. The base portion comprises a first and a second edge extending along the elongated direction, and further comprises a mating portion extending upwardly from a first edge of the base portion. The rail mounting system further comprises a module configured to be disposed on the mounting rail via the mating portion so as to be mounted on the structure. The module is moveable relative to the mounting rail along a direction from the second edge towards the first edge, so as to be detached from the mounting rail. A rail detaching method is also presented.

16 Claims, 9 Drawing Sheets

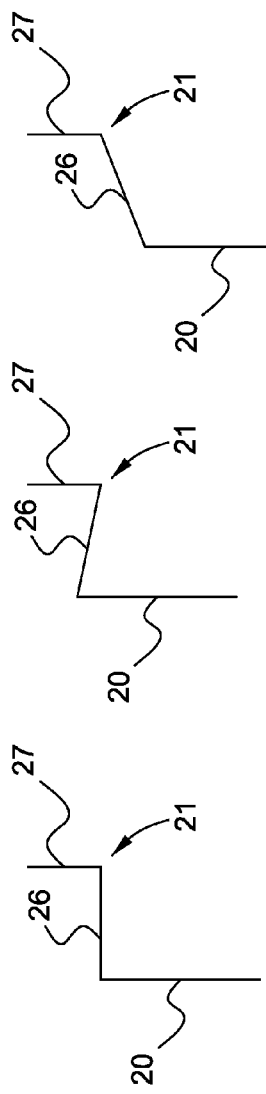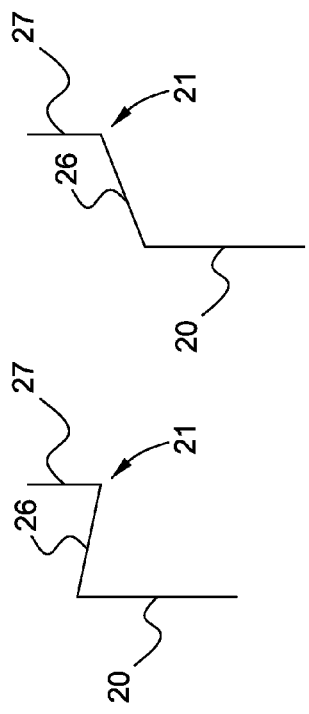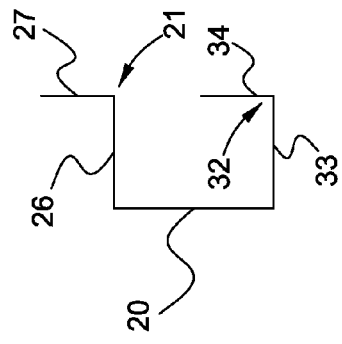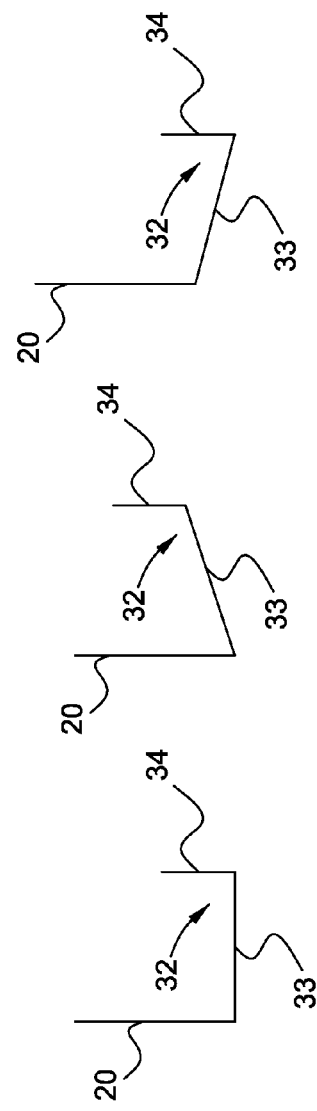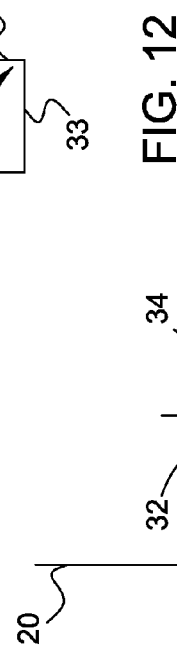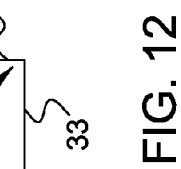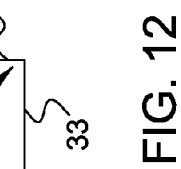
FIG. 6  FIG. 7  FIG. 8  FIG. 12
FIG. 9  FIG. 10  FIG. 11

RAIL MOUNTING SYSTEM AND DETACHING METHOD

BACKGROUND OF THE DISCLOSURE

This application relates generally to rail mounting systems and detaching methods. More particularly, this application relates to rail mounting systems for mounting modules on mounting rails and rail detaching methods for detaching the modules from the mounting rails.

Mounting rails, such as DIN rails have been widely used to mount modules, such as circuit breakers onto a surface of a structure. DIN is a German acronym, which stands for, when translated to English, the German Institute for Standardization. A DIN rail is an elongated rail that is bolted or otherwise mounted to the surface of the structure. The modules are then mounted onto the DIN rail so as to be mounted onto the structure via the DIN rail.

Generally, the modules, such as electrical breakers are designed to employ clamping devices, such as spring-loaded latches to clamp the DIN rail, so as to be detachably mounted on the DIN rail. During detaching the modules from the DIN rail, a user pulls the latches to disengage the latches from the DIN rail to detach the modules from the DIN rail.

In current applications, more than one module is mounted together side by side on the DIN rail for space compactness, and a comb bus is deployed to act as input terminals to electrically connect to the modules. However, the comb bus is usually disposed on the same side of the modules as the clamping devices, which may cause inconvenience for the user to pull the clamping devices to disengage the clamping devices from the DIN rail.

There have been attempts to detach the modules from the DIN rail. For example, the comb bus is removed from all of the modules, and then the user pulls the clamping devices to detach the target module(s) from the DIN rail. After detachment, the comb bus has to be reassembled to connect to all of the modules. This is time-consuming and inefficient with regard to the operation of the modules.

In addition, during detachment, the user often pulls the clamping devices to disengage the clamping devices from the DIN rail with one hand, while holding and pulling the modules from the DIN rail with the other hand. This may result in the complexity of detaching the modules from the DIN rail.

Therefore, there is a need for a new and improved rail mounting system and detaching method to mount modules on mounting rail and to detach the modules from the mounting rail efficiently and conveniently.

BRIEF DESCRIPTION OF THE DISCLOSURE

A rail mounting system for mounting a module on a structure is provided, in accordance with one aspect of the present system. The rail mounting system comprises a mounting rail configured to be disposed on the structure and comprising a base portion extending along an elongated direction. The base portion comprises a first and a second edge extending along the elongated direction. The mounting rail further comprises a mating portion extending upwardly from a first edge of the base portion. The rail mounting system further comprises a module configured to be disposed on the mounting rail via the mating portion so as to be mounted on the structure. The module is moveable relative to the mounting rail along a direction from the second edge towards the first edge, so as to be detached from the mounting rail.

A rail mounting system for mounting an electrical breaker on a structure is provided, in accordance with another aspect of the present system. The rail mounting system comprises a mounting rail configured to be disposed on the structure and comprising a base portion extending along an elongated direction. The base portion comprises a first and a second edge extending along the elongated direction. The mounting rail further comprises a mating portion extending upwardly from a first edge of the base portion. The rail mounting system further comprises an electrical breaker configured to be disposed on the mounting rail via the mating portion so as to be mounted on the structure, and an input terminal configured to be disposed on the module with one end, and to be disposed on the structure or the mounting rail with the other end thereof. Wherein the electrical breaker is moveable relative to the mounting rail along a direction from the second edge towards the first edge, so as to be detached from the mounting rail after the electrical breaker is released by the one end of the input terminal.

Still another aspect of the present system is directed to a rail detaching method for detaching a module from a structure. The rail detaching method detaching an input terminal from a module to release the module; moving the module relative to a mounting rail along a direction from a second edge towards a first edge of the mounting rail; and removing the module from the mounting rail, so as to detach the module from the structure. Wherein the mounting rail is disposed on the structure and comprises a base portion extending along an elongated direction, wherein the base portion comprises a first and a second edge extending along the elongated direction, wherein a mating portion extends upwardly from a first edge of the base portion, and wherein the module mates with the module to mount the module on the structure via the mounting rail.

These and other advantages and features will be more understood from the following detailed description of preferred embodiments of the invention that is provided in connection with the accompanying drawings.

BRIEF DESCRIPTION OF THE DRAWINGS

FIGS. 6-11 are schematic diagrams of the mounting rail, in accordance with various aspects of the present system;

FIG. 12 is a schematic diagram of the mounting rail, in accordance with another aspect of the present system;

DETAILED DESCRIPTION

Preferred embodiments of the present disclosure will be described hereinbelow with reference to the accompanying drawings. In the following description, well-known functions or constructions are not described in detail to avoid obscuring the disclosure in unnecessary detail.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity).

Moreover, in this specification, the suffix "(s)" is usually intended to include both the singular and the plural of the term that it modifies, thereby including one or more of that term (e.g., "the element" may include one or more elements, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

In addition, approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In some instances, the approximating language may correspond to the precision of an instrument for measuring the value. Further, as used herein, the terms "disposed on" and "adjacent" refer to components disposed directly in contact with each other or indirectly.

Figure 1:
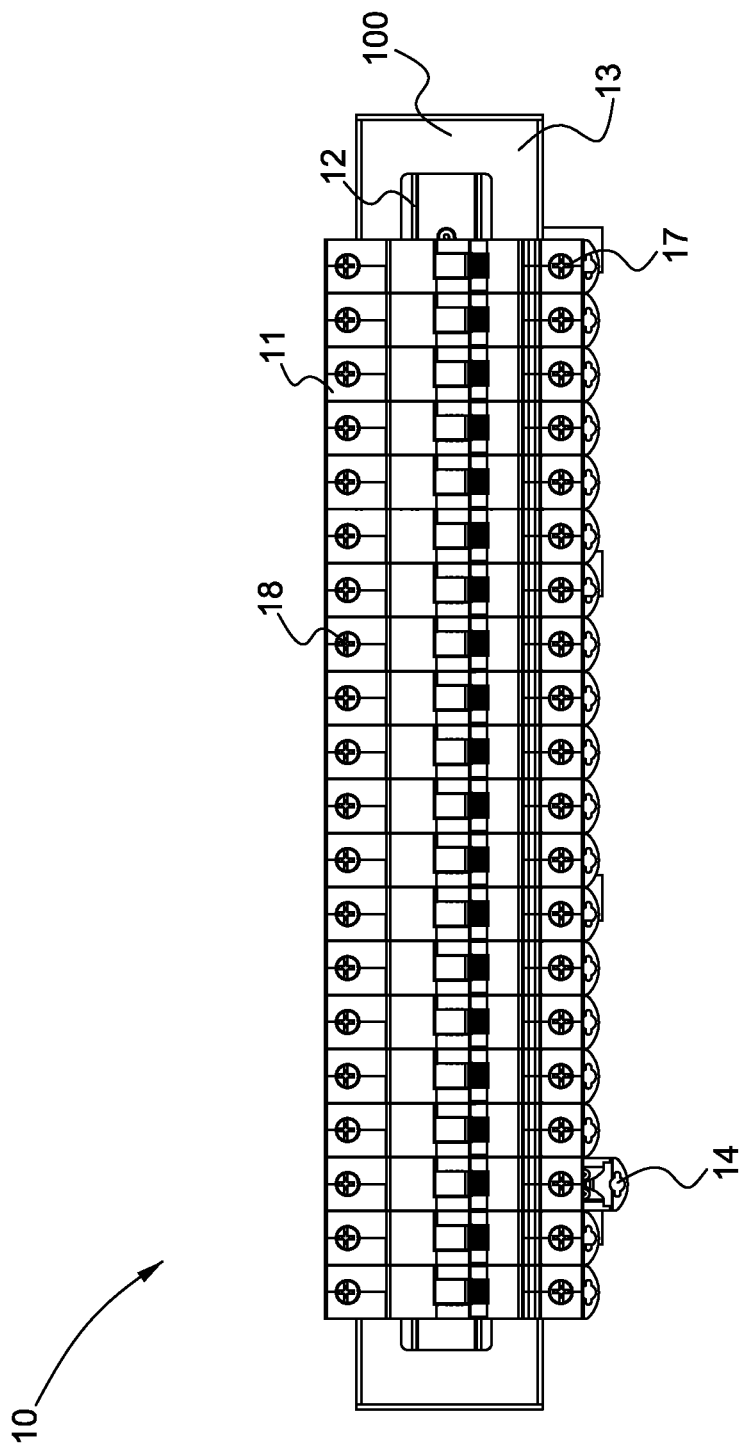
FIG. 1 is a schematic top view of a rail mounting system, in accordance with one aspect of the present system.
Figure 2:
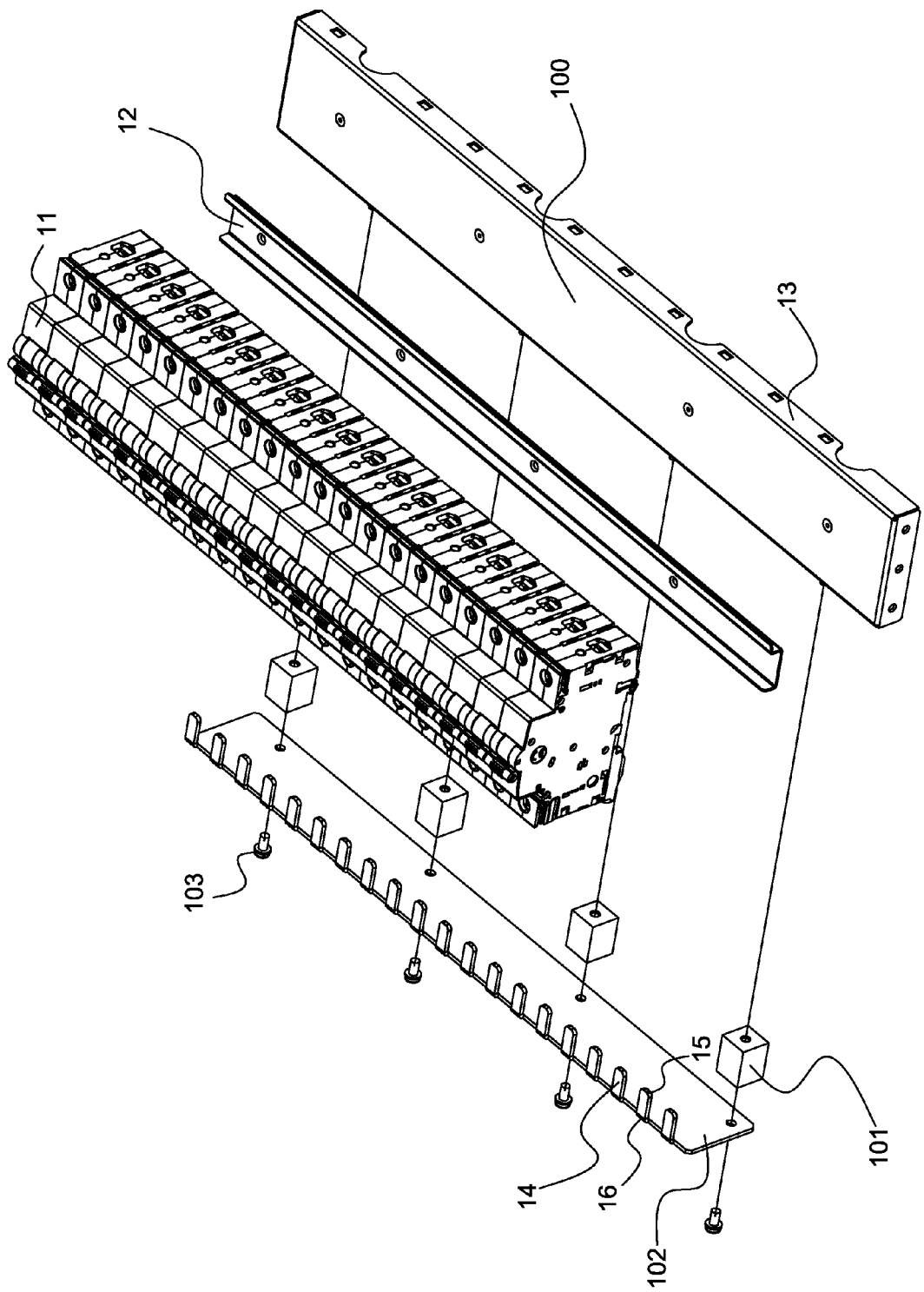
FIG. 2 is an exploded perspective view of the rail mounting system shown in FIG. 1.

FIG. 1 is a schematic top view of a rail mounting system 10, in accordance with one aspect of the present system. FIG. 2 is an exploded perspective view of the rail mounting system 10 shown in FIG. 1. As illustrated in FIGS. 1-2, the rail mounting system 10 comprises a plurality of modules 11 and a mounting rail 12 for mounting on a surface 100 of a structure 13.

In this example, the plurality of the modules 11 abuts against one another, so as to be disposed on the mounting rail 12 together side by side. In other examples, the plurality of the modules 11 may be spaced from each other to be disposed on the mounting rail 12. Although more than one module 11 is illustrated in this example, a single module may be deployed on the mounting rail 12.

In some examples, the modules 11 may include electrical modules or other suitable modules to be mounted on the mounting rail 12. Non-limiting examples of the electrical modules include circuit boards, circuit breakers, input/output modules, and switches. In this non-limiting example, the modules 11 comprise the circuit breakers. Generally, the circuit breakers are automatically operated electrical switches to discontinue an electrical current after detecting a fault condition caused by overload or short circuit, so as to protect an electrical circuit from damage. During operation, the circuit breakers can be reset either manually or automatically to resume to a normal operation, and have different sizes based on different applications.

As depicted in FIGS. 1-2, the mounting rail 12 is disposed on the surface 100 of the structure 13. The plurality of the modules 11 are thus mounted on the surface 100 of the structure 13 via the mounting rail 12. In non-limiting examples, the mounting rail 12 may be detachably fixed on the surface 100 of the structure 13 via suitable fixing techniques. For example, the mounting rail 12 is detachably bolted on the surface 100 of the structure 13.

The structure 13 is configured to support the mounting of the module(s) 11 and the mounting rail 12 thereon. In some examples, the structure 13 may have any suitable configurations or shapes. Non-limiting examples of the structure 13 include a wall, a case and a cabinet. In this example, although being separated from each other, the mounting rail 12 and the structure 13 may be integrated together with each other. For example, the mounting rail 12 is unitarily formed on the structure 13.

In the illustrated example, the rail mounting system 10 further comprises a plurality of input terminals 14 and a plurality of output terminals (not shown). In certain applications, when a single module is deployed, a single input terminal and a single output terminal are employed. Each of the input terminals 14 is configured to mate with the corresponding module 11 with a mating (or one) end 15 and to mate with a power source (not shown) with a connecting (or the other) end 16 thereof.

Similarly, each of the output terminal(s) is configured to mate with the corresponding module 11 with one end and to mate with a load (not shown) with another end thereof. As a result, an electrical connection is formed between the power source and the load via the respective input terminals 14, the modules 11 and the output terminals during the normal operation of the modules 11.

In some applications, the mating end(s) 15 of the input terminal(s) 14 are detachably fixed on the respective module(s) 11. In one example, the modules 11 defines a plurality of receiving spaces (not labeled) to receive the respective mating ends 15, and a plurality of screws 17 are employed to fix the mating ends 15 into the respective receiving spaces of the modules 11. After the screws 17 are released from the respective modules 11, the respective modules 11 are released by the mating ends 15.

Accordingly, in some examples, the modules 11 may be moveable relative to the mounting rail 12 and/or the input terminals 14. Similarly, the output terminals may also be detachably fixed on the respective modules, for example using a plurality of respective screws 18.

In this example, the connecting ends 16 of the input terminals 14 are connected each other to form a unitary connecting element 102, which is detachably fixed on the structure 13, for example by one or more screws 103 and one or more fixing blocks 101. In other examples, the connecting ends 16 of the input terminals 14 may be employed separately from each other and be detachably fixed on the structure 13. In other applications, the connecting ends 16 of the input terminals 14 may be fixed on the mounting rail 12. Thus, the input terminals 14 may also function as a supporting element to support the mounting of the modules 11 on the mounting rail 12.

Figure 3:
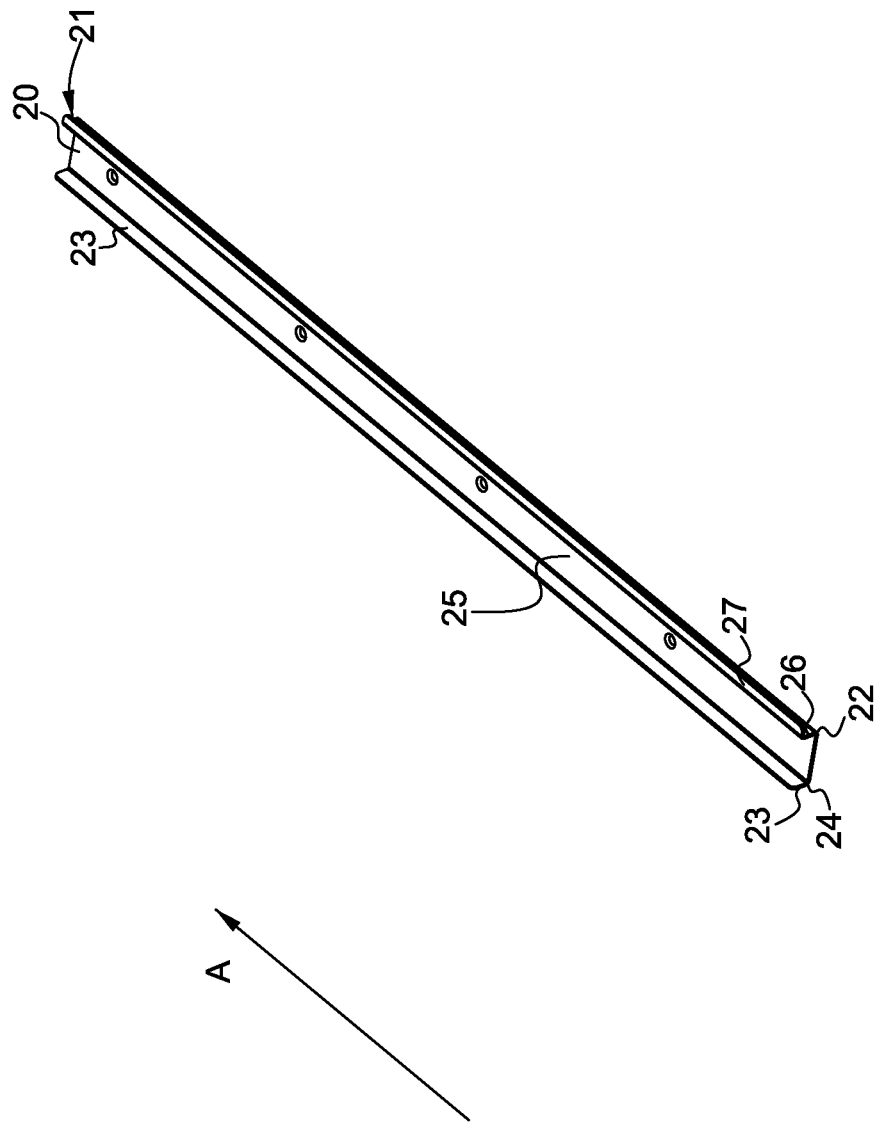
FIG. 3 is a perspective view of a mounting rail, in accordance with one aspect of the present system.

FIG. 3 is a perspective view of the mounting rail 12, in accordance with one aspect of the present system. As illustrated in FIG. 3, the mounting rail 12 comprises a base portion 20 extending along an elongated direction A, a mating portion 21 extending upwardly from a first edge 22 of the base portion 20, and an extending portion 23 extending upwardly from a second edge 24 of the base portion 20. The first edge 22 and the second edge 23 extend along the elongated direction A and are opposite to each other. The plurality of the modules 11 are disposed on the mounting rail 12 side by side along the elongated direction A (shown in FIG. 1).

In the illustrated example of FIG. 3, the base portion 20 has a horizontal mounting surface 25 for mounting on the surface 100 of the structure 13 (shown in FIGS. 1-2). In other applications, the base portion 20 may have other suitable shapes, such as an irregular shape, for mounting on the structure 13.

The mating portion 21 is configured to mate with the modules 11 to mount the modules 11 on the structure 13. In this example, the mating portion 21 comprises a connecting portion 26 extending upwardly from the first edge 22 of the base portion 20 and a flange portion 27 extends from a free end (not labeled) of the connecting portion 26 along a direction from the second edge 24 towards the first edge 22 of the base portion 20. In one non-limiting example, the connecting portion 26 is substantially perpendicular to the base portion 20, and the flange portion 27 is substantially perpendicular to the connecting portion 26.

Figure 4:
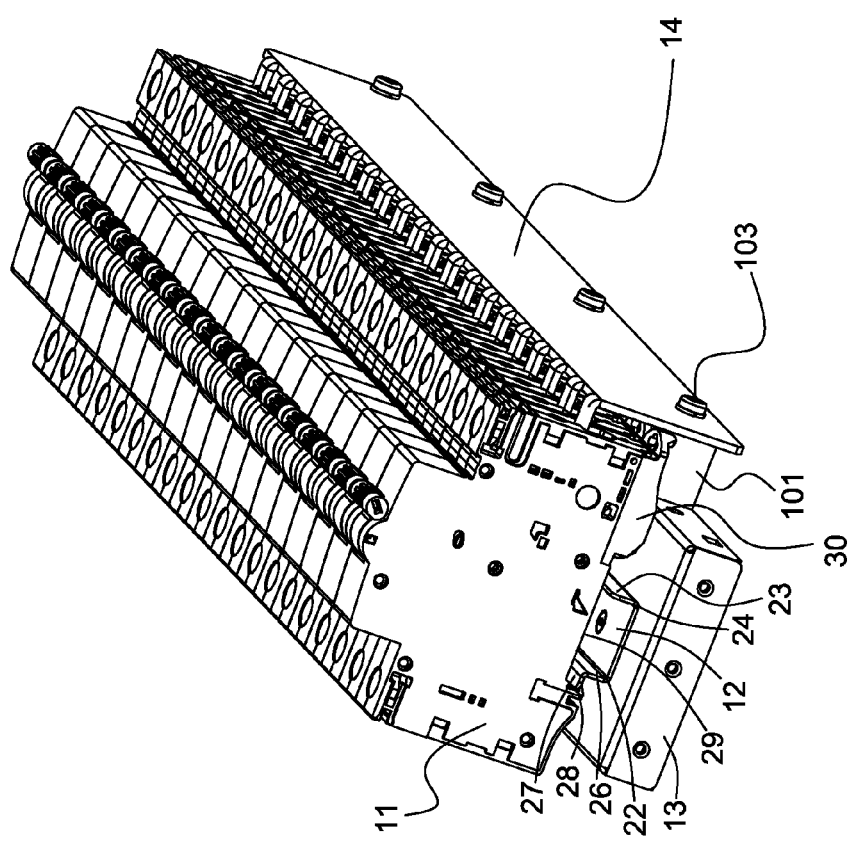
FIG. 4 is an assembled perspective view of the rail mounting system shown in FIG. 2.
Figure 5:
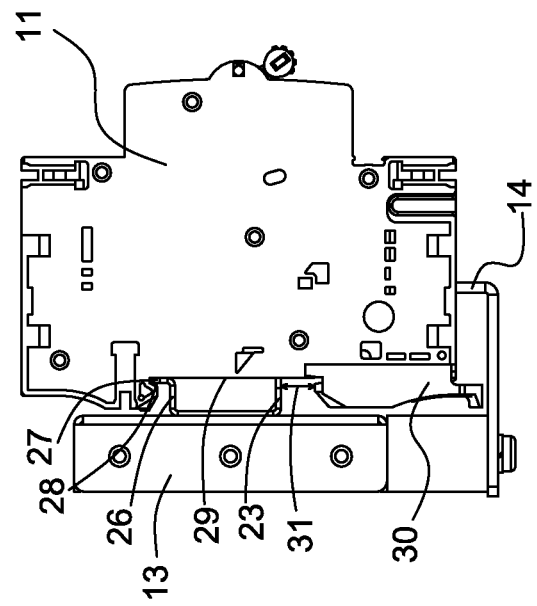
FIG. 5 is a schematic side view of the rail mounting system shown in FIG. 4.

FIG. 4 is a perspective assembled view of the rail mounting system 10 shown in FIG. 2. FIG. 5 is a schematic side view of the rail mounting system 10 shown in FIG. 4. As illustrated in FIGS. 4-5, the modules 11 are mounted on the surface 100 of the structure 13 via the mounting rail 12. The input terminals 14 are electrically connected to the respective modules 11 with the mating ends 15 and are detachably fixed on the structure 13 with the connecting ends 16 thereof. The first and second edges 22, 24 of the base portion 20 are disposed away from and adjacent to the input terminals 14 respectively, such that the mating portion 21 and the extending portion 23 (shown in FIG. 3) are disposed away from and adjacent to the input terminals 14 respectively.

Each of the modules 11 defines a receiving channel 28 on a mounting side 29 thereof, which is a bottom side of the module 11 in this example. The receiving channel 28 extends on the mounting side 29 along the elongated direction A and is configured to receive the flange portion 27 of the mating portion 21 of the mounting rail 12.

In the illustrated example, the receiving channel 28 is recessed into the mounting side 29 along a horizontal direction, and the flange portion 27 of the mounting rail 12 extends into the receiving channel 28. Thus, due to the mating of the flange portion 27 and the receiving channel 28, the movement of the modules 11 may be restricted by the mounting rail 12 along a direction from the first edge 22 towards the second edge 24, and a direction perpendicular to the base portion 20, such as an upward or a downward direction.

As used herein, in non-limiting examples, the upward or downward direction is a direction of the modules 11 moving upwardly or downwardly relative to the mounting rail 12, which may be perpendicular to the elongated direction A. The direction from the first edge 22 towards the second edges 24 or the direction from the second edges 24 towards the first edge 22 may be or may not be a direction parallel to a direction from the first edge 22 to the second edge 24 or from the second edge 24 to the first edge 22 respectively, which may or may not be perpendicular to the elongated direction A.

In this example, the extending portion 23 does not mate with the mating side 29 of the modules 11, such that the extending portion 23 may not restrict the movement of the modules 11. Accordingly, the modules 11 move relative to the mounting rail 12 along the direction from the second edge 24 towards the first edge 22. In some examples, the direction from the second edge 24 towards the first edge 22 may be perpendicular to the elongated direction A and being away from the respective input terminals 14. In other examples, the direction from the second edge 24 towards the first edge 22 may be a direction parallel to the direction from the second edge 24 to the first edge 22, and be perpendicular to the elongated direction A.

Thus, as discussed above, after the respective target module(s) 11 are released by the input terminals 14, the target modules 11 move along the direction from the second edge 24 towards the first edge 22, so that the flange portion 27 of the mounting rail 12 disengages with the receiving channels 28 of the target modules 11. As a result, the target modules 11 are detached or removed from the mounting rail 12. As compared to conventional rail mounting systems, in this example, not all of the input terminals are need to be detached from the modules. After the input terminals 14 connected to the target modules are detached, the target modules 11 move along the direction from the second edge 24 towards the first edge 22 to be detached from the mounting rail 12.

In some examples, as depicted in FIGS. 4-5, although the rail mounting system 10 comprises a clamping device 30 disposed on the bottom side 29 of the modules 11 adjacent to the input terminals 14, the clamping device 30 is optionally employed. In this example, the extending portion 23 is disposed adjacent to the clamping device 30, and a space 31 is defined between the extending portion 23 and the clamping device 30. During detaching the modules 11, due to existence of the space 31, the modules 11 are moveable relative to the mounting rail 12 along the direction from the second edge 24 towards the first edge 22.

In some applications, the distance of the space 31 may be greater than the distance of the flange portion 27 receiving into the receiving channel 28 of the modules 11. In certain applications, the extending portion 23 may optionally contact the bottom side 29 to support the modules 11.

It should be noted that the arrangement in FIGS. 1-5 are merely illustrative. In some examples, the mounting rail 12 may have other configurations. FIGS. 6-11 are schematic diagrams of the mounting rail 12, in accordance with various aspects of the present system. The arrangement of the mounting rail 12 in FIG. 6 is similar to the arrangement in FIG. 3. The two arrangements in FIGS. 3 and 6 differ in that the arrangement of the mounting rail 12 in FIG. 6 does not comprise the extending portion 23 extending upwardly from the second edge 24 of the base portion 20 of the mounting rail 12.

The arrangements of the mounting rail 12 in FIGS. 7-8 are similar to the arrangement of the mounting rail 12 in FIG. 6. The arrangements of the mounting rail 12 in FIGS. 6-8 differ in that, as illustrated in FIG. 6, the flange portion 27 is substantially perpendicular to the connecting portion 26, and as illustrated in FIGS. 7-8, the angles between the flange portion 27 and the connecting portion 26 are an acute angle and an obtuse angle, respectively.

In some applications, the angle between the flange portion 27 and the connecting portion 26 may be greater than 0 degree and less than 180 degrees. Depending on the angles between the flange portion 27 and the connecting portion 26, orientations of the receiving channel 29, such as an angle between the receiving channel 28 and the mounting side 30 of the respective modules 11, may be different to receive the flange portion 27 having different orientations.

As illustrated in FIGS. 9-11, the arrangements of the mounting rail 12 are different from the arrangements in FIGS. 6-8. In FIGS. 9-11, a mating portion 32 extends upwardly from the second edge 24 of the base portion 20, which is similar to the mating portion 21 shown in FIGS. 6-8.

In the illustrated examples, the mating portion 32 comprises a connecting portion 33 extending upwardly from the second edge 24 of the base portion 20, and a flange portion 34 extending from a free end of the connecting portion 33. Being different from the flange portion 27 of the mating portion 21, the flange portion 34 extends towards the first edge 22 of the base portion 20 and away from the input terminals 14. Similar to the mating portion 20, an angle between the connecting portion 33 and the base portion 20 and an angle between the flange portion 34 and the connecting portion 33 are greater than 0 degree ad less than 180 degrees, respectively.

Thus, during assembly, similar to the flange portion 27, the flange portion 34 extends into a receiving channel (not shown) similar to the receiving channel 28 defined on the mounting side 29 of the modules 11, so that the movement of the modules 11 is restricted by the mounting rail 12 along the upward and downward directions, and the direction from the first edge 22 towards the second edge 24 of the base portion 20. Accordingly, the modules 11 are moveable along the direction from the second edge 24 towards the first edge 22.

In certain applications, the mounting rail 12 may comprise the base portion 20, the (first) mating portion 21 and the (second) mating portion 32, and both of the two flange portions 27, 34 extend along the direction from the second edge 24 towards the first edge 22, as illustrated in FIG. 12. Thus, more than one receiving channel may be defined in the mounting side 29 of the modules 11. In non-limiting examples, a distance of the flange portion 34 extending from the connecting portion 33 may be smaller than a distance between the second edge 24 and the first edge 22 along a direction perpendicular to the elongated direction A.

Figure 13:
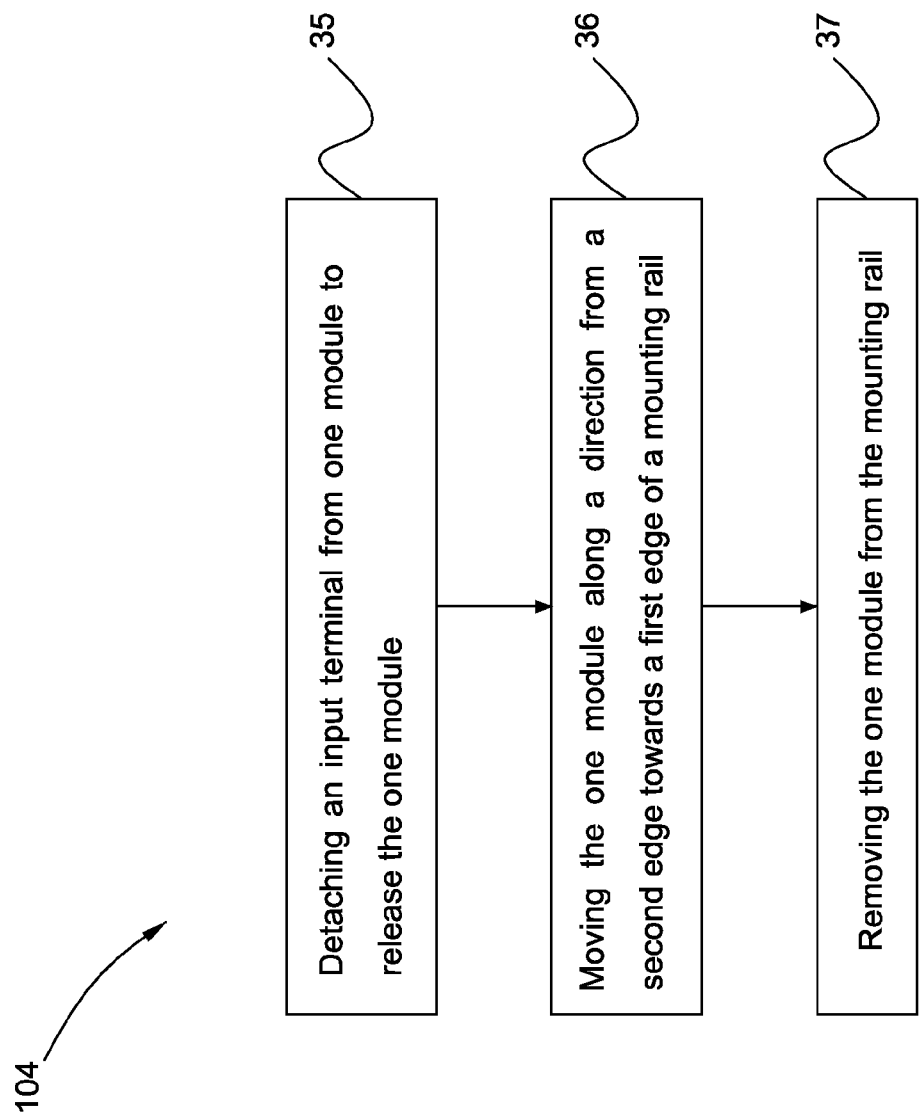
FIG. 13 is a schematic flow chart showing detaching one module from the mounting rail.

FIG. 13 is a schematic flow chart 104 showing detaching one module 11 from the mounting rail 12. As depicted in FIG. 13, in step 35, the input terminal 14 is detached from the one module 11, so that the one module 11 is released. In non-limiting examples, a screwdriver (not show) is employed to remove the screw 17 from the one module 11, so as to detach the input terminal 14 from the one module 11 to release the one module 11. In other examples, the step 35 may be not employed when the input terminal 14 is not employed.

In step 36, the one module 11 moves along the direction from the second edge 24 towards the first edge 22 to disengage the mating portion 27 and/or 34 from the receiving channel 28 of the one module 11, so that in step 37, the one module 11 is removed from the mounting rail 12. Based on different application, such as replacement of the one module 11, a new module is then mounted onto the mounting rail 12.

Figure 14:
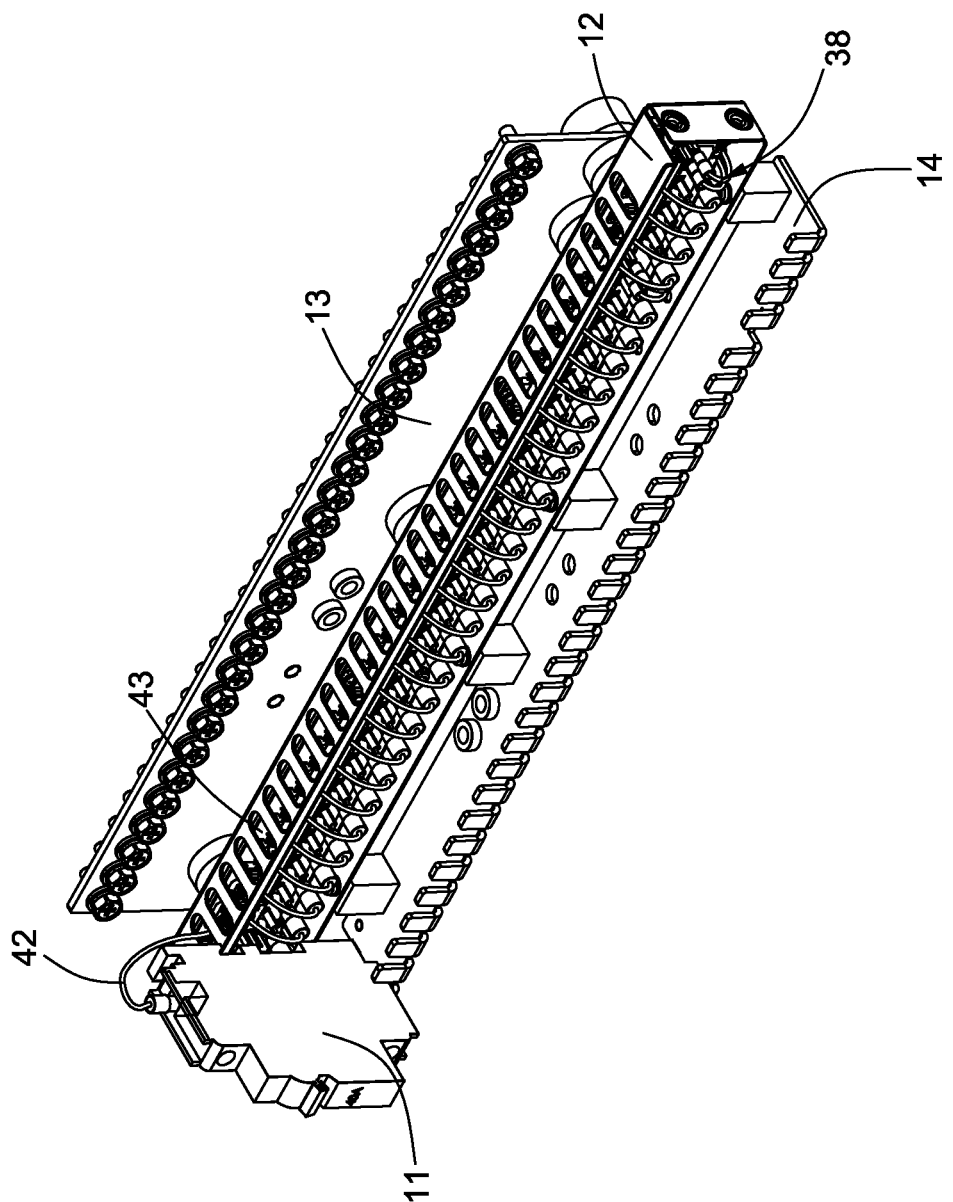
FIG. 14 is a schematic perspective view of the rail mounting system including a monitoring apparatus, in accordance with one aspect of the present invention.
Figure 15:
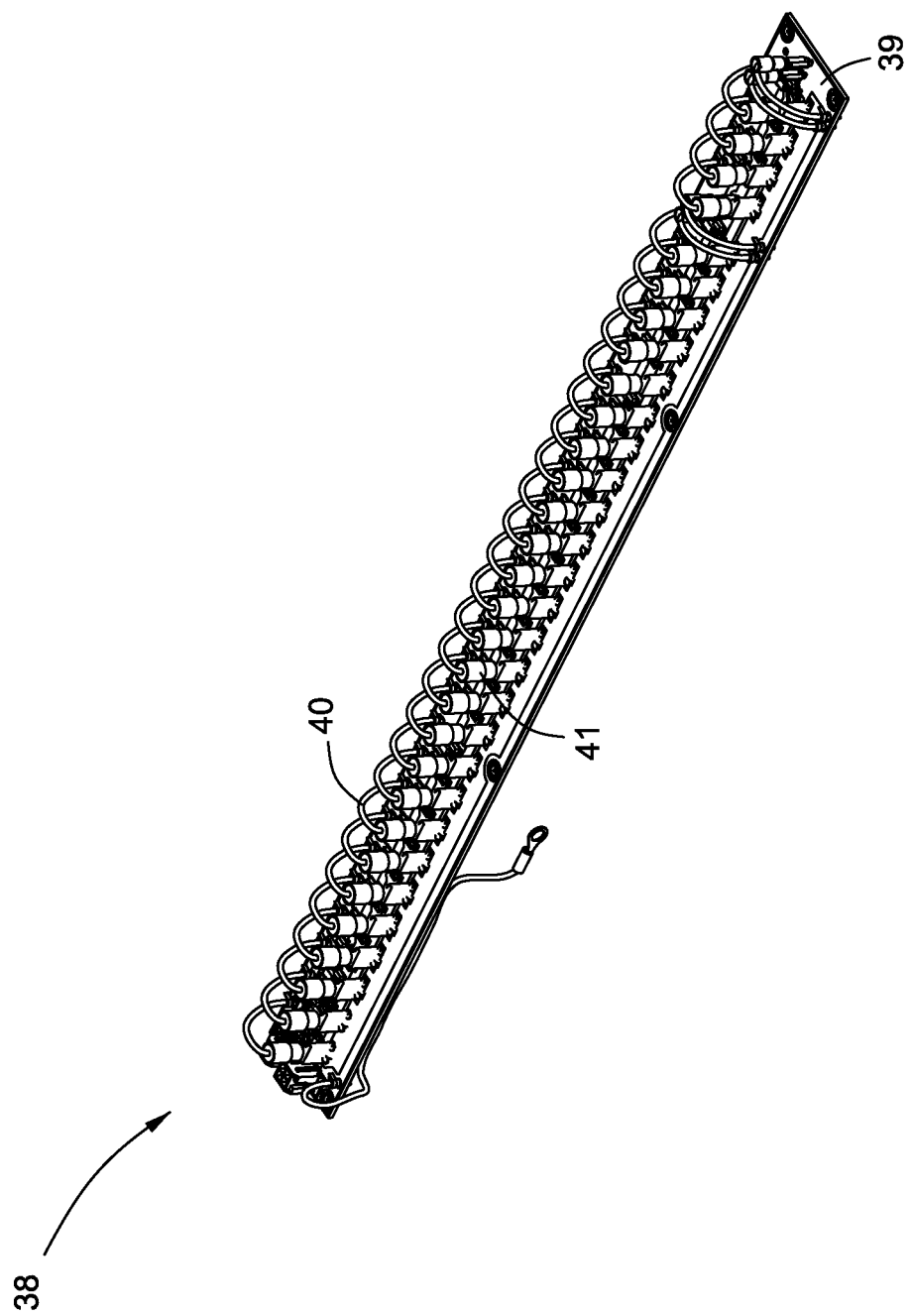
FIG. 15 is a schematic perspective view of the monitoring apparatus shown in FIG. 14.

In certain applications, in order to ensure safe operation of the modules, such as the electrical breakers, the rail mounting system 10 may further comprises a monitoring apparatus to monitor the operation of the modules. FIG. 14 is a schematic perspective view of the rail mounting system 10 including a monitoring apparatus 38, in accordance with one aspect of the present invention. FIG. 15 is a schematic perspective view of the monitoring apparatus 38 shown in FIG. 14.

As depicted in FIGS. 14-15, the monitoring apparatus 38 is disposed on the mounting rail 12, and comprises an electronic element 39 and a plurality of electrical elements 40. The electronic element 39 extends along the elongated direction A, and is disposed on the mounting surface 25 of the base portion 20 of the mounting rail 12. In some applications, the electronic element 39 may be non-conductively disposed on the mounting rail 12, for example an insulated element (not shown) is disposed between the electronic element 39 and the base portion 20 of the mounting rail 12 for electrical insulation.

The electrical elements 40 are disposed on the electronic element 39 and are arranged separately and non-conductively from each other along the elongated direction A. In this example, the electronic element 39 comprises a PCB (printed circuit board). The electrical elements 40 comprise electrical wirings, and each wiring is disposed on the electronic element 39 with two ends (not labeled) thereof detachably fixed on two sides (not labeled) of the electronic element 39. Further, the monitoring apparatus 38 optionally comprises a plurality of receptacles 41, and each receptacle 41 is configured to receive one end of the electrical element 40.

In some examples, the electrical elements 40 may be electrically connected to the electronic element 39 and the respective modules 11. The electrical element 40 is configured to detect the operation status of the respective modules 11, and generate and transmit response signals to the electronic element 39 when the modules 11 are in a fault condition. For example, one or more modules 11 discontinue a flow of an electrical current between the power source and the load after the one or more modules 11 detect the fault condition caused by overload or short circuit.

In the illustrated example in FIG. 14, during assembly, the electrical elements 40 are disposed under the respective modules 11. The electrical elements 40 are electrically connected to the respective modules 11 via a plurality of electrical wires 42 for detection of the operation status of the respective modules 11. In some examples, for detecting the operation status of the modules 11, one end (not labeled) of each wire 42 may be detachably fixed on the electronic element 39, so as to be electrically connect to the corresponding end of the electrical element 40. Another end of each wire 42 may be electrically connect to elements, such as copper sheets (not shown) disposed at sides (not labeled) of the respective modules 11 adjacent to the load.

In this example, the connecting portion 26 of the mounting rail 12 defines a plurality of opening 43, so that the electrical wires 42 pass through the respective opening 43 to electrically connect the respective electrical elements 40 and the modules 11. Although being employed separately, the electrical wires 42 may be unitary with the respective electrical elements 40.

The electronic element 39 may be electrically connected to a control system (not shown), and configured to receive and transmit the response signals from the respective electrical elements 40 to the control system. The control system may generate light, sound or other suitable alarm signals after receiving the respective response signals from the electronic elements 40 to indicate the modules, which the electrical elements 40 connects to, is in the fault condition.

Thus, a user may take suitable actions to the rail mounting system 10, for example to resume the module(s) in the fault condition to the normal operation and/or replace the module(s) in the fault condition with new modules.

It should be noted that the arrangement of the rail mounting system 10 in FIGS. 14-15 are illustrative. Although more than one electrical element 40 is employed in this example, a single electrical element 40 may be employed in other examples. The electronic element 39 may comprise other suitable circuit boards, and the electrical elements 40 may comprise other suitable elements to electrically connect the respective modules 11 and the electronic element 39.

In embodiments of the invention, the modules are disposed on the mounting rail and are moveable along the direction from the second edge towards the first edge. This beneficially simplifies the detaching process of the modules from the mounting rail. In some examples, the mounting rail comprise at least one flange portion to mate with the modules, which has the simple structure. Further, with the employment of the mounting rail in the present system, the modules may not be equipped with clamping devices to clamp the mounting rail. This beneficially saves manufacturing cost of the modules, and retrofit conventional rail mounting systems.

In addition, the rail mounting system employs the monitoring apparatus to monitor the operation status of the modules, so as to ensure the safe operation of the system. In the arrangements of the present system, the monitoring apparatus has a simple structure. This beneficially saves costs and improves the system stability.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A rail mounting system for mounting a module on a structure, the rail mounting system comprising:
    a mounting rail configured to be disposed on the structure and comprising a base portion extending along an elongated direction, the base portion comprising a first and a second edge extending along the elongated direction, and the mounting rail further comprising a mating portion extending upwardly from a first edge of the base portion;
    a module configured to be disposed on the mounting rail via the mating portion so as to be mounted on the structure, and the module being moveable relative to the mounting rail along a direction from the second edge towards the first edge, so as to be detached from the mounting rail;
    wherein the mating portion comprises a connecting portion extending upwardly from the first edge of the base portion, and a flange portion extending from the connecting portion along the direction from the second edge towards the first edge, and wherein the flange portion mates with the module to mount the module on the structure via the mounting rail; and
    wherein the mounting rail further comprises an extending portion extending upwardly from the second edge of the base portion, and wherein the mounting rail further comprises a flange portion extending from the extending portion along the direction from the second edge towards the first edge of the base portion.

2. The rail mounting system of claim 1, wherein the movement of the module relative to the mounting rail is restricted along a direction perpendicular to the base portion and a direction from the first edge towards the second edge.

3. The rail mounting system of claim 2, wherein the direction perpendicular to the base portion comprises a direction of the module moving upwardly or downwardly relative to the mounting rail, and wherein the upward or downward direction is perpendicular to the elongated direction.

4. The rail mounting system of claim 1, wherein an angle between the connecting portion and the base portion is greater than 0 degree and smaller than 180 degrees, and wherein an angle between the flange portion and the connection portion is greater than 0 degree and smaller than 180 degrees.

5. The rail mounting system of claim 1, further comprising a monitoring apparatus disposed on the base portion of the mounting rail, the monitoring apparatus configured to monitor an operation status of the module.

6. The rail mounting system of claim 5, wherein the monitoring apparatus comprises an electronic element disposed on the base portion of the mounting rail, and an electrical element electrically disposed on the electronic element and electrically connected to the module.

7. The rail mounting system of claim 6, wherein the electrical element is configured to detect the operation status of the module, and generate and transmit a response signal to the electronic element when the module is in a fault condition, and wherein the electronic element is configured to receive and transmit the response signal to generate an alarm signal.

8. A rail mounting system for mounting a module on a structure, the rail mounting system comprising:
    a mounting rail configured to be disposed on the structure and comprising a base portion extending along an elongated direction, the base portion comprising a first and a second edge extending along the elongated direction, and the mounting rail further comprising a mating portion extending upwardly from a first edge of the base portion;
    a module configured to be disposed on the mounting rail via the mating portion so as to be mounted on the structure, and the module being moveable relative to the mounting rail along a direction from the second edge towards the first edge, so as to be detached from the mounting rail;
    further comprising an input terminal comprising a mating ends being detachably and electrically connected to the module, and a connecting ends extending from the mating ends to be detachably fixed on one of the mounting rail and the structure, and wherein the module is moveable relative to the mounting rail along the direction from the second edge towards the first edge after the module is released by the input terminal.

9. A rail mounting system for mounting an electrical breaker on a structure, the rail mounting system comprising:
    a mounting rail configured to be disposed on the structure and comprising a base portion extending along an elongated direction, the base portion comprising a first and a second edge extending along the elongated direction, and the mounting rail further comprising a mating portion extending upwardly from a first edge of the base portion;
    an electrical breaker configured to be disposed on the mounting rail via the mating portion, so as to be mounted on the structure via the mounting rail;
    an input terminal configured to be electrically connected to the electrical breaker with one end, and to be disposed on the structure or the mounting rail with the other end thereof;
    wherein the electrical breaker is moveable relative to the mounting rail along a direction from the second edge towards the first edge, so as to be detached from the mounting rail after the electrical breaker is released by the one end of the input terminal; and
    wherein the mating portion comprises a connecting portion extending upwardly from the first edge of the base portion, and a flange portion extending from the connecting portion along the direction from the second edge towards the first edge, and wherein the flange portion mates with the module to mount the electrical breaker on the structure via the mounting rail.

10. The rail mounting system of claim 9, wherein the movement of the electrical breaker relative to the mounting rail is restricted along a direction perpendicular to the base portion and a direction from the first edge towards the second edge, wherein the direction perpendicular to the base portion comprises a direction of the electrical breaker moving upwardly or downwardly relative to the mounting rail along a direction perpendicular to the elongated direction.

11. The rail mounting system of claim 9, wherein an angle between the connecting portion and the base portion is greater than 0 degree and smaller than 180 degrees, and wherein an angle between the flange portion and the connection portion is greater than 0 degree and smaller than 180 degrees.

12. The rail mounting system of claim 9, wherein the mounting rail further comprises an extending portion extending upwardly from the second edge of the base portion, and wherein the mounting rail further comprises a flange portion extending from the extending portion along the direction from the second edge towards the first edge of the base portion.

13. The rail mounting system of claim 9, further comprising a monitoring apparatus disposed on the base portion of the mounting rail to monitor the operation of the module.

14. The rail mounting system of claim 13, wherein the monitoring apparatus comprises an electronic element disposed on the base portion, and an electrical element electrically disposed on the electronic element and electrically connected to the module, wherein the electrical element is configured to detect the operation of the module and generate and transmit a response signal to the electronic element when the module is in a fault condition, and wherein the electronic element is configured to receive and transmit the response signal to generate an alarm signal.

15. A rail detaching method for detaching a module from a structure, the rail detaching method comprising:
   detaching an input terminal from a module to release the module;
   moving the module relative to a mounting rail along a direction from a second edge towards a first edge of the mounting rail, wherein the mounting rail is disposed on the structure and comprises a base portion extending along an elongated direction, wherein the base portion comprises a first and a second edge extending along the elongated direction, wherein a mating portion extends upwardly from a first edge of the base portion, and wherein the module mates with the module to mount the module on the structure via the mounting rail;
   removing the module from the mounting rail, so as to detach the module from the structure; and
   positioning a monitoring apparatus on the base portion of the mounting rail such that the monitoring apparatus is configured to monitor the operation of the module, wherein the monitoring apparatus comprises an electronic element disposed on the base portion, and an electrical element electrically disposed on the electronic element and electrically connected to the module, wherein the electrical element is configured to detect the operation of the module and generate and transmit a response signal to the electronic element when the module is in a fault condition, and wherein the electronic element is configured to receive and transmit the response signal to generate an alarm signal.

16. The rail detaching method of claim 15, wherein the movement of the module relative to the mounting rail is restricted along a direction perpendicular to the base portion and a direction from the first edge towards the second edge, wherein the direction perpendicular to the base portion comprises a direction of the modulae moving upwardly or downwardly relative to the mounting rail along a direction perpendicular to the elongated direction.

\* \* \* \* \*